: 
United States Patent [19]

Fey

[11] Patent Number: 5,486,346
[45] Date of Patent: Jan. 23, 1996

[54] SYNTHESIS OF CATHODE MATERIAL SUCH AS LINIVO$_4$ AND LICOVO$_4$ FOR LITHIUM SECONDARY BATTERIES

[75] Inventor: George T. Fey, Chung Li City, Taiwan

[73] Assignee: Industrial Technology Research Institute, Hsinchu, Taiwan

[21] Appl. No.: 243,393

[22] Filed: May 13, 1994

[51] Int. Cl.$^6$ .................... C01G 51/00; C01G 53/00; H01M 4/58; H01M 4/52
[52] U.S. Cl. .................... 423/594; 429/218; 429/223
[58] Field of Search ................ 423/594; 429/218, 429/223

[56] References Cited

U.S. PATENT DOCUMENTS

| | | | |
|---|---|---|---|
| 4,567,031 | 1/1986 | Riley | 423/594 |
| 5,196,278 | 3/1993 | Idota | 429/218 |
| 5,264,201 | 11/1993 | Dahn et al. | 423/594 |
| 5,336,572 | 8/1994 | Koksbang | 429/223 |

FOREIGN PATENT DOCUMENTS 554906  8/1993  European Pat. Off. ............ 423/594

OTHER PUBLICATIONS

J. C. Bernier et al., "Académie des Sciences" Compt. Rendus., 253, 1961, no month, 1578.

J. C. Berneir et al., "Étude Cristallographique et magnétique de deux vanadates mixtes spinelles" Bull. Soc. Chim. France; 1963, no month, 1661–1666.

J. Preudhomme et al., "Infrared studies of Spinels—IV Normal Spinels with a high–valency tetrahedral cation" Spectrochimica Acta, no month 1972, 69–79.

M. Th. Paques–Ledent, "Corrélations entre le type structural et la composition chimique des composés de formule générale ABXO$_4$," Ind. Chim. Belg, no month 1974, 845.

Y. Ito, "LiVO$_3$–NiO 系の相関係 とLiNiVO$_4$ の二三の性状", no month 1979, Chem. Soc. of Japan, No. 11, pp. 1483–1487.

Y. Ito et al., "スピネル型複酸化物LiMVO$_4$ (M=Co, Ni) の性質$^{1) 2)}$" The Chemical Society of Japan, no month 1986, 1069–73, No. 8.

R. J. Hill et al. "Peak Shape Variation in Fixed–Wavelength Neutron Powder Diffraction and its Effect on Structural Parameters Obtained by Rietveld Analysis" J. Appl. Cryst. no month, 1985, 173–80, No. 18.

H. M. Rietveld, "A Profile Refinement Method for Nuclear and Magnetic Structures" J. Appl. Cryst., no month, 1969, 65–71, No. 2.

J. R. Dahn et al., "Dependence of The Electrochemical Intercalation of Lithium in Carbons on the Crystal Structure of the Carbon" Electrochimica Acta, 1993, no month, 1179–91, vol. 38, No. 9.

JCPDS Card 38–1395, 1990, no month.

*Primary Examiner*—Steven Bos
*Attorney, Agent, or Firm*—W. Wayne Liauh

[57] ABSTRACT

A method for preparing cathode material for use in lithium secondary batteries comprising the steps of: (a) mixing first and second reactants in a appropriate stoichiometric ratio to form a reaction mixture, wherein the first reactant is represented by Li$_x$MO$_2$, M is either Ni or Co, and x is a variable from 0.25 to 1.1, and the second reactant is V$_2$O$_3$; V$_2$O$_5$, or NH$_4$VO$_3$, and (b) sintering the mixture in air at temperatures between 650° C.~700° C. for 1~2 hours to obtain a cathode material represented by LiMVO$_4$. The first reactant can be obtained by an aqueous-phase reaction by mixing a first aqueous solution, which contains M(NO$_3$)$_2$.6H$_2$O, and a second aqueous, which contains LiOH.H$_2$O, Li$_2$O, Li$_2$CO$_3$, or Li(CH$_3$COO), to form a precursory aqueous solution, and drying the precursory aqueous solution. Very high purity cathode materials can be obtained at a substantially reduced reaction time and substantially reduced reaction temperature, both of which will contribute to reduced production cost. The lithium secondary batteries so prepared can provide discharge voltages between 4.5~4.9 volts.

11 Claims, 14 Drawing Sheets

SYNTHESIS OF CATHODE MATERIAL SUCH AS LINIVO₄ AND LICOVO₄ FOR LITHIUM SECONDARY BATTERIES

FIELD OF THE INVENTION

The present invention relates to methods for preparing cathode material for use in lithium secondary batteries. More particularly, the present invention relates to methods for synthesizing cathode materials, such as $LiNiVO_4$ and $LiCoVO_4$, for use in lithium secondary batteries.

BACKGROUND OF THE INVENTION

Recently, lithium secondary batteries have become the subject of profound interest as they represent the newest generation of high-performance secondary batteries. The advantages of lithium secondary batteries include their high energy density, steady discharging characteristic, wide range of working temperatures, long shelf life, good safety, and low environmental pollution, etc. Lithium secondary batteries can be widely used in mobile phones, notebook personal computers, personal digital assistants, cameras, camcorders, portable VCRs, etc. The market potential and the economic significance of the lithium secondary batteries cannot be overstated.

At present, the cathode materials used in lithium batteries mainly belong to one of the three types: $LiCoO_2$, $LiNiO_2$, and $LiMn_2O_4$. All of these cathode materials can provide voltages over 3 volts, with $LiCoO_2$ providing the highest voltage—as high as 4 volts. The higher the voltage provided by a battery cell, obviously, the lower the number of battery cells that will be required to form a battery unit of desired overall voltage. Since the energy density provided by a battery cell is the product of battery voltage and its capacity, a battery cell with higher voltage output also provides higher energy density. Therefore, in the search for high energy density battery cells, it is important to develop cathode materials that will generate high voltage.

In 1961, J. C. Bernier, et al., discovered that the crystal structures of $LiNiVO_4$ and $LiCoVO_4$ belonged to that of an inverse spinel. They used the following procedure to synthesize these materials:

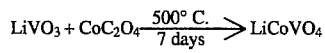

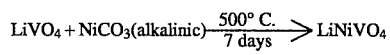

The above method is not very practical in that it requires very long synthesis time, seven days, thus it does not meet the commercially acceptable economic criteria.

In 1979, Y. Ito published an article, in which it was disclosed that $LiNiVO_4$ can be synthesized in 100 hours at 1,000° C., with a system of reactants, $LiVO_3$ and NiO, at a molar ratio of 1:1. Although the method disclosed by Ito substantially reduced the synthesis time for $LiNiVO_4$ from 7 days to 4 days, it requires that the reaction be conducted at a very high temperature of 1,000° C.; this makes the process economically unattractive. Also the reaction time of 4 four days does not meet the economic criteria. Prior to the synthesis process, it was necessary to first synthesize the reactants by mixing and reacting $NiO_4$, $V_2O_5$, and $Li_2O$, in appropriate proportions. This also adds to the production cost. Furthermore, it was discovered that, with this high-temperature process, the lithium atoms were wedged inside the metallic oxide structure. Also, at temperatures above 850° C., some "fusion" occurred during the reaction, and the reactants reacted with the reactor material.

SUMMARY OF THE INVENTION

The primary object of the present invention is to provide an improved cathode material that will overcome the drawbacks of the lithium secondary batteries that currently available. More particularly, the primary object of the present invention is to provide synthesis methods for preparing cathode materials that can be used for making high performance lithium secondary batteries with high output voltage.

The present invention is the fruit of many years of dedicated research efforts by the inventor. With the process disclosed in the present invention, high purity cathode material for use in high performance high voltage lithium secondary batteries can be synthesized with reduced reaction time, and the process does not require excessively high reaction temperature, such as the 1,000° C. required by the prior art process. Furthermore, the methods disclosed in the present invention can be easily implemented in large scale mass productions, with reduced manufacturing cost.

The present invention discloses, among other things, two alternate methods to synthesize two types of cathode materials for use in lithium secondary batteries: $LiCoVO_4$ and $LiNiVO_4$. The first method involves a solid-phase sintering process, and the second method involves an aqueous-phase solution process. These two methods are briefly discussed below:

1. Solid-Phase Sintering Method:

The first method, which involves a solid-phase reaction using a sintering procedure, can be summarized by the following reaction formula:

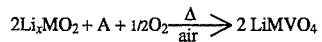

In the above reaction formula, M can be either nickel (Ni) or cobalt (Co); A can be $V_2O_3$, $V_2O_5$, or $NH_4VO_3$; and x is a variable from 0.25 to 1.1. Preferably, the value of x is about 0.75–0.80. To proceed with the reaction, $Li_xMO_2$ and A are mixed, in accordance with an appropriate molar ratio, and ground. Thereafter, the mixture is sintered in air at temperatures between 650° C.~ 700° C. for 1~2 hours to obtain the cathode material $LiMVO_4$.

2. Aqueous-Phase Solution Method:

The second method, which involves an aqueous-phase reaction, can be summarized by the following reaction formula:

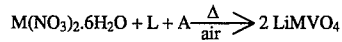

In the above reaction formula, M can be either nickel (Ni) or cobalt (Co); L can be $LiOH.H_2O$, $Li_2O$, $Li_2CO_3$, or $Li(CH_3COO)$; and A can be $V_2O_3$, $V_2O_5$, or $NH_4VO_3$. To proceed with the reaction, aqueous solutions of $M(NO_3)_2.6H_2O$ and L are mixed for form a precursor aqueous solution. Then compound A is added to the precursor aqueous solution and thoroughly mixed. The mixture solution is then dried and ground. Thereafter, the dried solution is sintered in air at 680° C.~ 700° C. for 1~2 hours to obtain the cathode material $LiMVO_4$.

Compared to the prior art methods, high purity cathode materials can be prepared from the methods disclosed in the present invention at a substantially lower reaction temperature and with a substantially reduced reaction time. Thus significant economic benefits can be obtained from the processes disclosed in the present invention.

BRIEF DESCRIPTION OF THE DRAWING

The present invention will be described in detail with reference to the drawings showing the preferred embodiments of the present invention, wherein:

FIGS. 11a and 1b show the X-ray diffraction curves of two LiCoVO$_4$ compounds, respectively, prepared from two embodiments of the solid-phase sintering process disclosed in the present invention.

DETAILED DESCRIPTION OF THE PREFERRED EMBODIMENT

The present invention will now be described more specifically with reference to the following preferred embodiments. It is to be noted that the following descriptions of example including preferred embodiment of this invention are presented herein for purpose of illustration and description; it is not intended to be exhaustive or to limit the invention to the precise form disclosed.

As described above, the present invention discloses, among other things, two alternate methods to synthesize two types of cathode materials for use in lithium secondary batteries: LiCoVO$_4$ and LiNiVO$_4$. The first method involves a solid-phase sintering process, and the second method involves an aqueous-phase solution process. These two methods are further discussed below:

Solid-Phase Sintering Method:

The first method, which involves a solid-phase reaction using a sintering procedure, can be summarized by the following reaction formula:

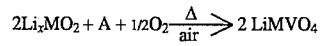

$$2Li_xMO_2 + A + 1/2O_2 \xrightarrow[air]{\Delta} 2\,LiMVO_4$$

In the above reaction formula, M can be either nickel (Ni) or cobalt (Co); A can be $V_2O_3$, $V_2O_5,$ or $_{NH_4}VO_3$; and x is a variable. To proceed with the reaction, $Li_xMO_2$ and A are mixed, in accordance with an appropriate stoichiometric ratio, and ground. Thereafter, the mixture is sintered in air at temperatures between 650° C.–700° C. for 1–2 hours to obtain the cathode material LiMVO$_4$.

Figure 1:
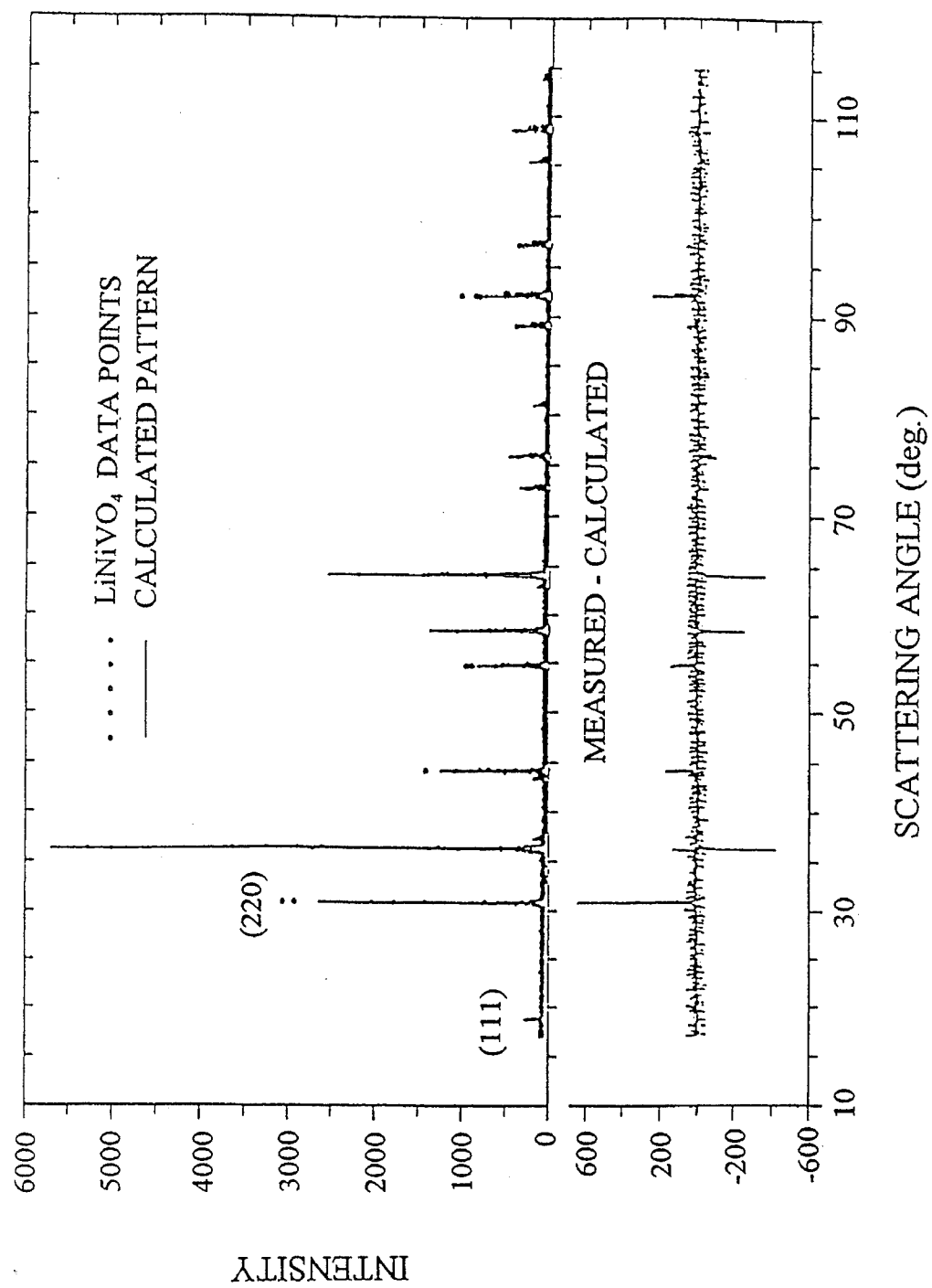
FIG. 1 shows the theoretical and experimental X-ray diffraction curves of the LiNiVO$_4$ compound prepared from the solid-phase sintering process disclosed in the present invention.
Figure 2:
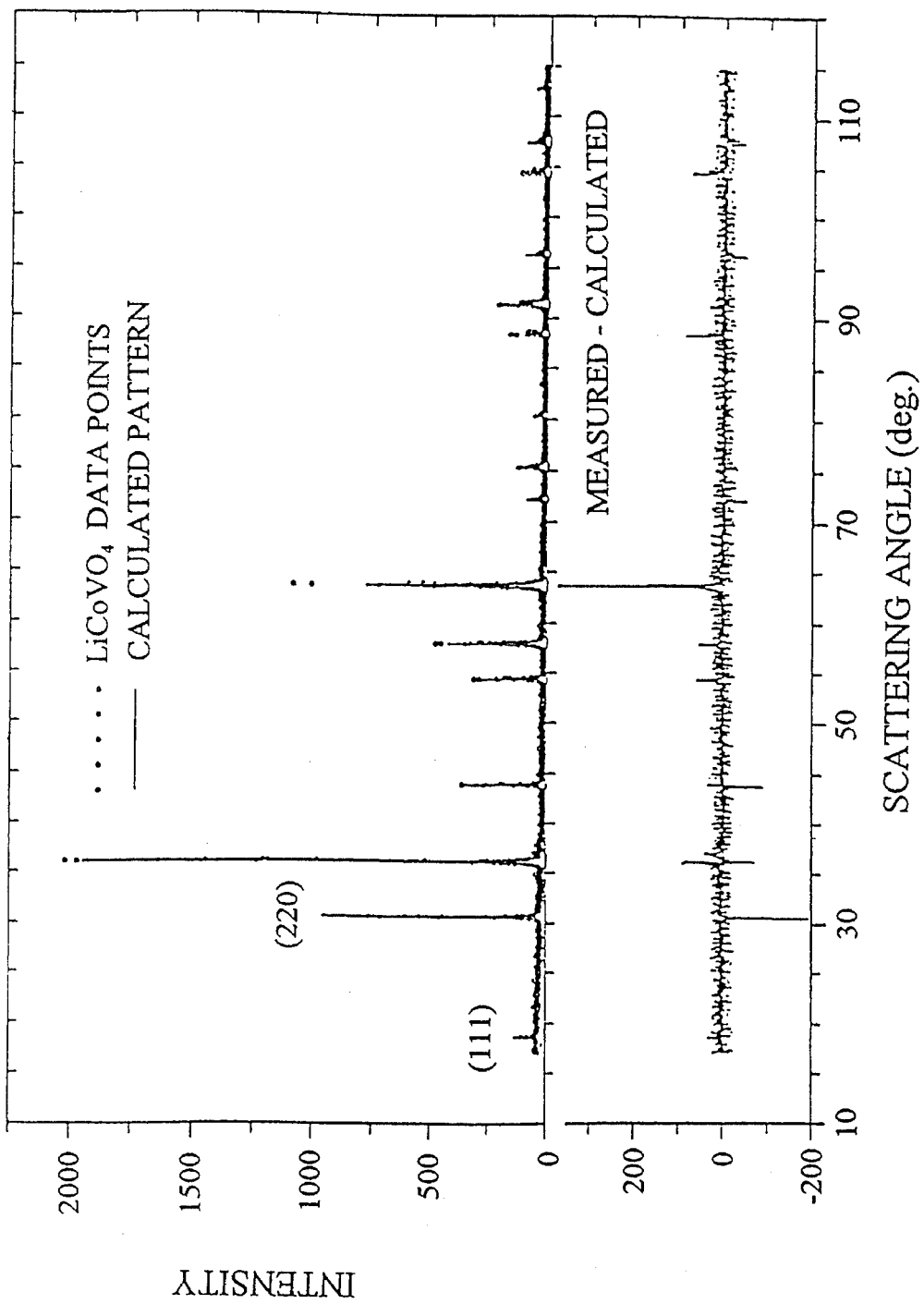
FIG. 2 shows the theoretical and experimental X-ray diffraction curves of the LiCoVO$_4$ compound prepared from the solid-phase sintering process disclosed in the present invention.

FIGS. 1 and 2 show the theoretical and experimental X-ray diffraction curves of LiNiVO$_4$ and LiCoVO$_4$, respectively, prepared from the solid-phase sintering process disclosed above. These data conform to those reported in the prior art for both compounds. In FIGS. 1 and 2, the solid lines represent the simulated or theoretical curves based on the structure of inverse spinel; whereas, the dotted fines represent the experimental data. It is shown that the experimental data match well with the theoretical calculations.

Two of the major structural characteristics of the inverse spinel are shown by peaks (111) and (220); and the peak height of (220) is far greater than that of (111). On the other hand, for spinels, such as LiMn$_2$O$_4$, the reverse is true, i.e., the peak height (111) is substantially higher than that of (220). Theoretical calculations were based on the Rietveld formula, as modified by Hill and Howard. The crystal lattice spacing of the compounds prepared in the present invention was measured to be 8.225 Å, this is very close to the literature value of 8.220 Å.

Figure 3:
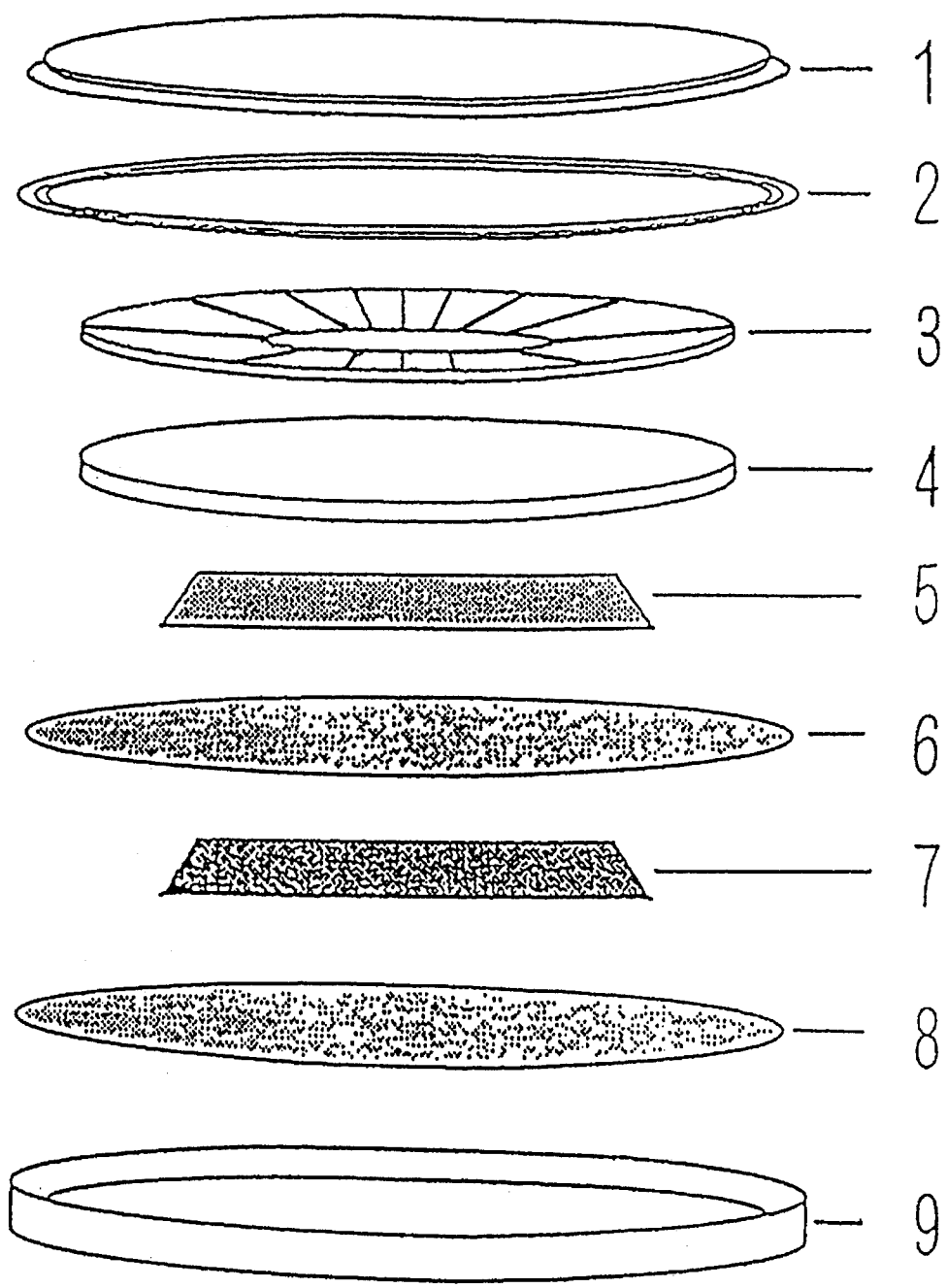
FIG. 3 shows an exploded view of a coin-shaped battery.

A coin-shaped battery as shown in FIG. 3 was prepared according to a standard procedure described in many open literatures. The battery comprises a stainless steel cover 1, a polypropylene bearing ring 2, a resilient steel disc 3, a stainless steel disc 4, an anode 5, a partitioning disc 6, a cathode 7, an aluminum foil 8, and a corrosion-resistant stainless steel battery shell 9. The anode 5 was a lithium foil having a width of 125 μm. The partitioning disc 6 was made of polypropylene having appropriate microporosities (Tradename Celgard 2502). The cathode was made of LiCoVO$_4$ or LiNiVO$_4$, both of which were prepared using the methods disclosed in the present invention. The aluminum foil 8 was coated with a homogeneous layer containing Super δ carbon black, polyvinylidene, and adhesive. Two types of electrolytes were used in the experiments. The first type of electrolyte contains 1M LiPF$_6$ dissolved in a mixture solvent containing dimethyl carbonate (DMC), propylene carbonate (PC), and ethylene carbonate (EC). The volummetric ratio of DMC:PC:EC was 50:25:25. The second type of electrolyte contains 1M LiBF$_4$ dissolved in a mixture solvent containing dimethyl carbonate, propylene carbonate, and ethylene carbonate, in a ratio of 66:17:17.

Figure 4:
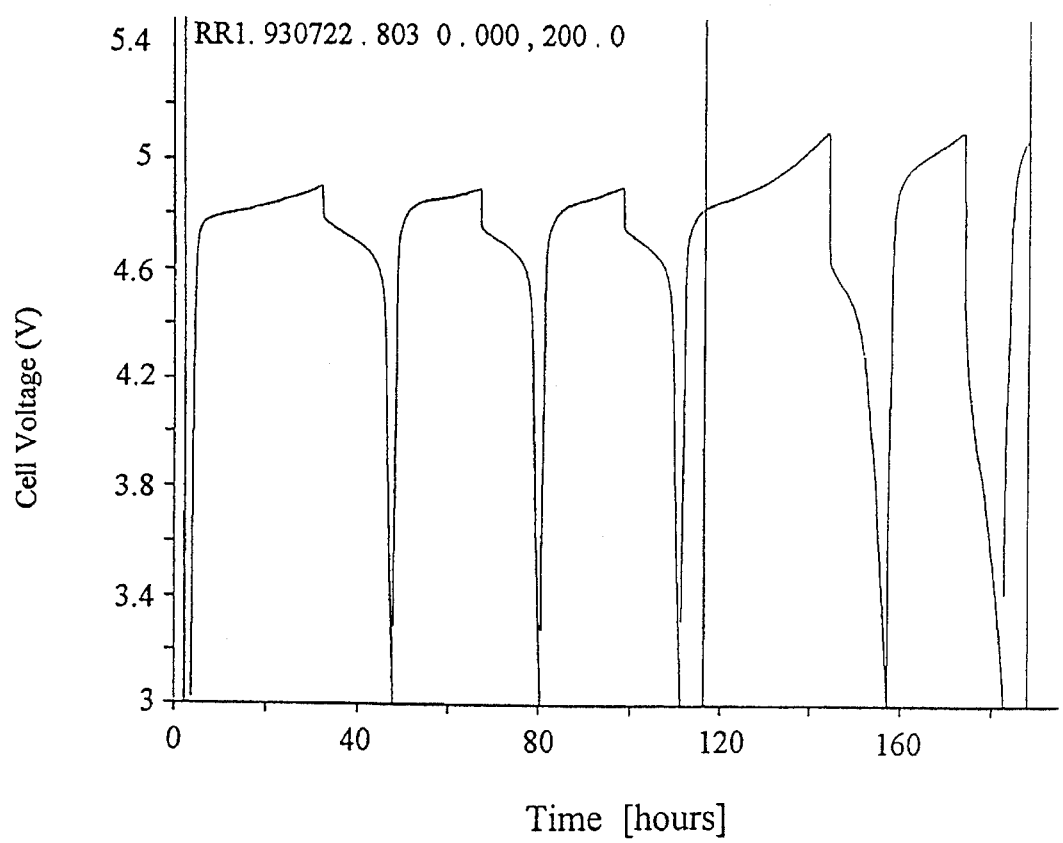
FIG. 4 shows the charge-discharge curve of a lithium secondary battery using a first electrolyte solution and the Li/LiNiVO$_4$ prepared from the process disclosed in the present invention.
Figure 5:
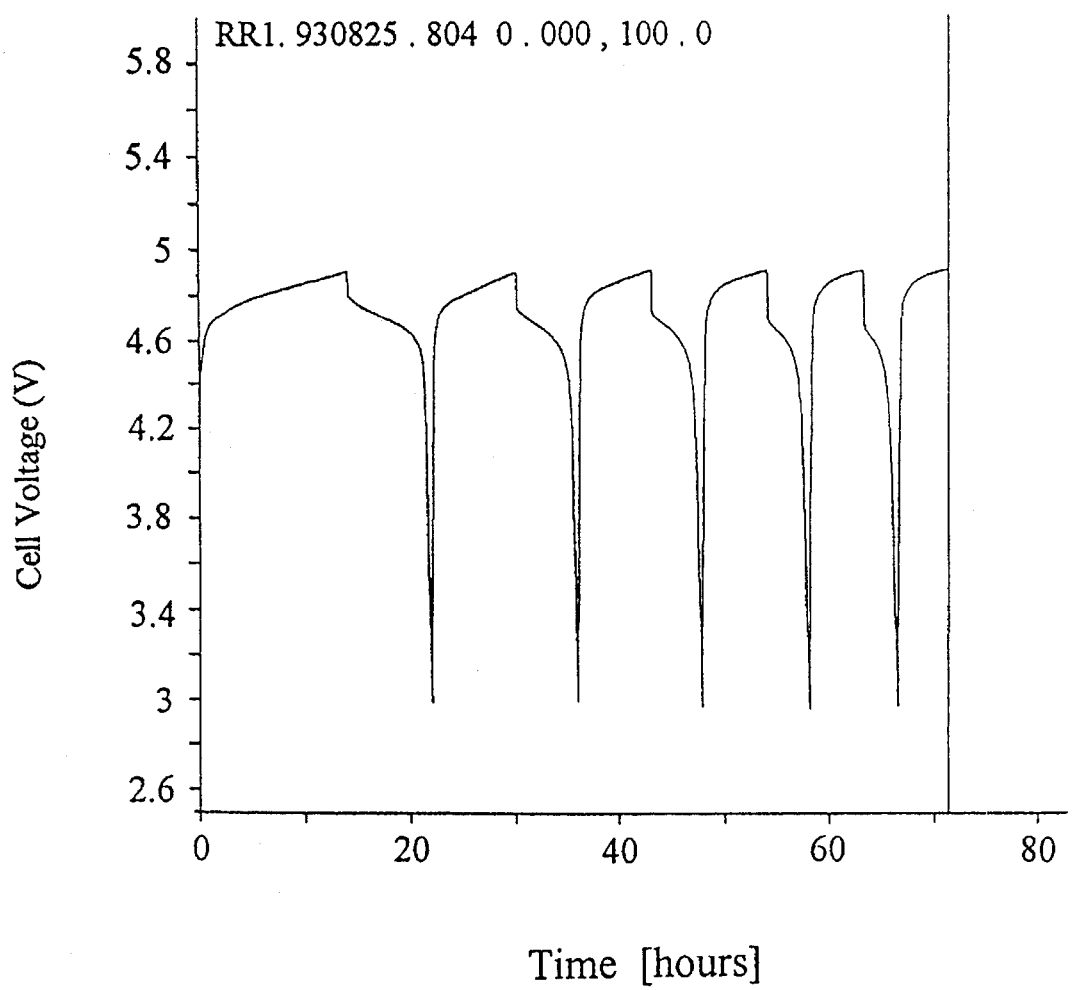
FIG. 5 shows the charge-discharge curve of a lithium secondary battery using a second electrolyte solution and the Li/LiNiVO$_4$ prepared from the process disclosed in the present invention.

FIG. 4 shows the charge-discharge curve of a Li/LiNiVO$_4$ lithium secondary battery as shown in FIG. 3 prepared using the first electrolyte solution, which was contained in the microporous partitioning disc 6. FIG. 5 is the same charge-discharge curve but was obtained from a Li/LiCoVO$_4$ lithium secondary battery, also using the first electrolyte solution. FIGS. 4 and 5 clearly show good reversibility of the two batteries. It is preferred that the batteries be charged/discharged at voltages between 3.0 and 4.9 volts. Also as shown in FIGS. 4 and 5, an average output voltage of 4.7 can be obtained when the battery was charged/discharged at voltages between 3.0 and 4.9 volts. This is the highest voltage among all the single cell battery systems that are known to-date.

Figure 6:
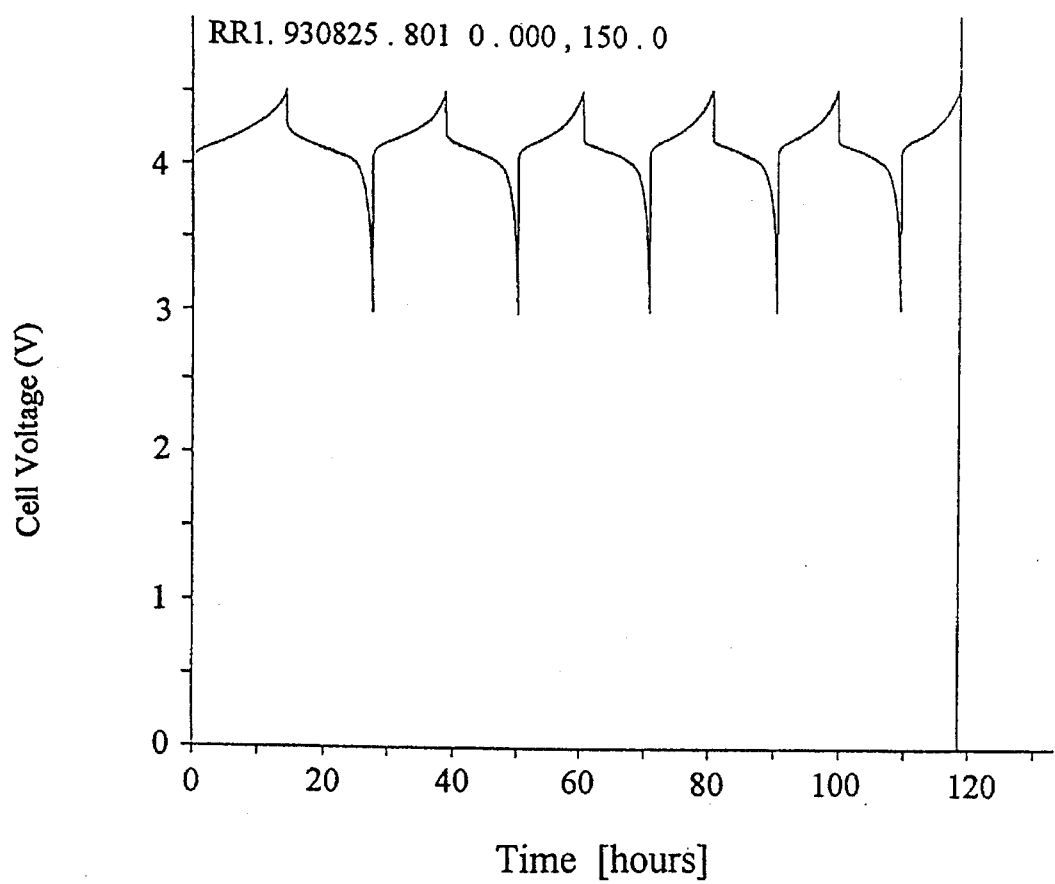
FIG. 6 shows the charge-discharge curve of a lithium secondary battery using a second electrolyte solution and the Li/LiCoVO$_4$ prepared from the process disclosed in the present invention.
Figure 7:
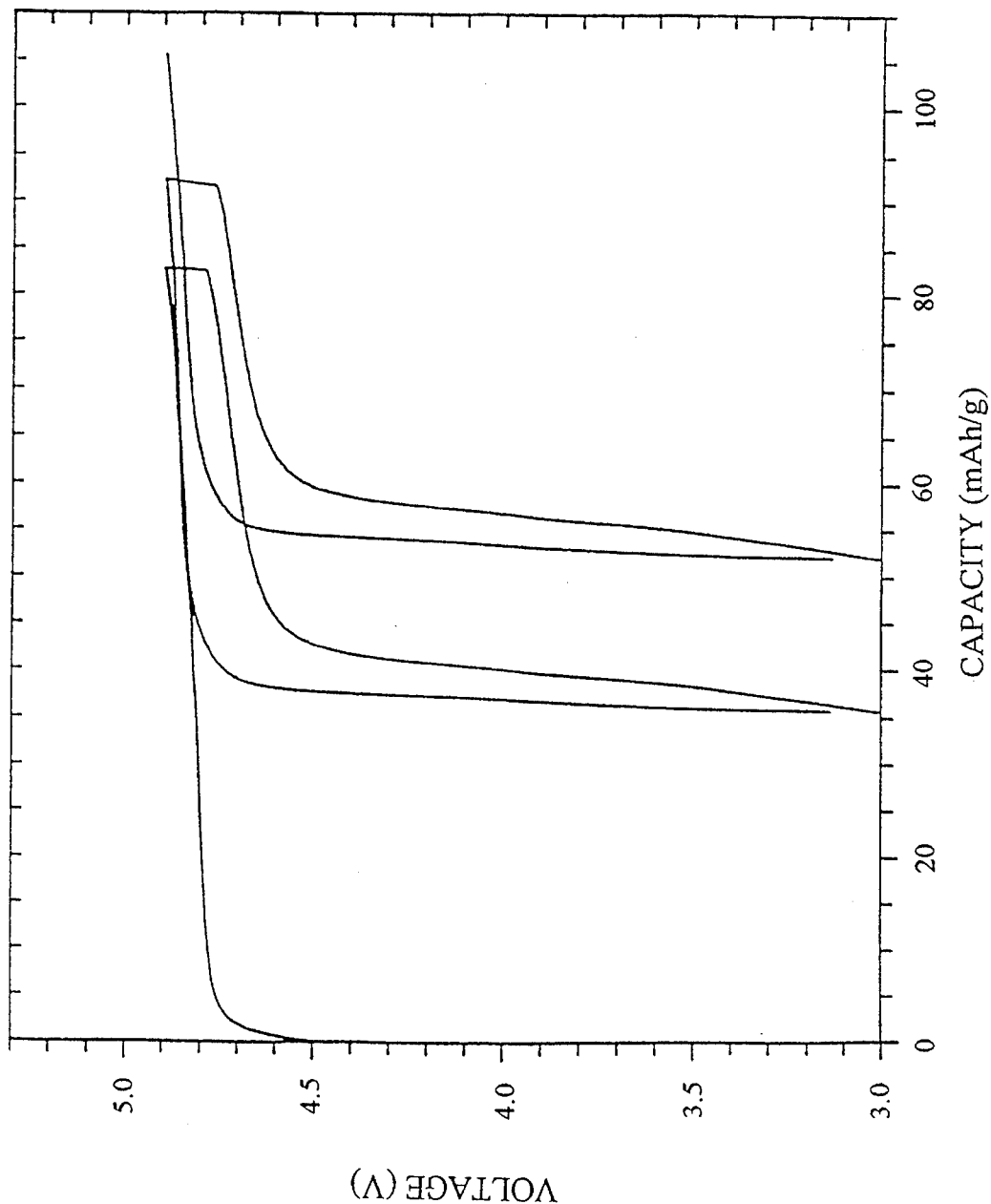
FIG. 7 shows the voltage-capacity relationship of a Li/LiNiVO$_4$ secondary battery prepared from the process disclosed in the present invention.
Figure 8:
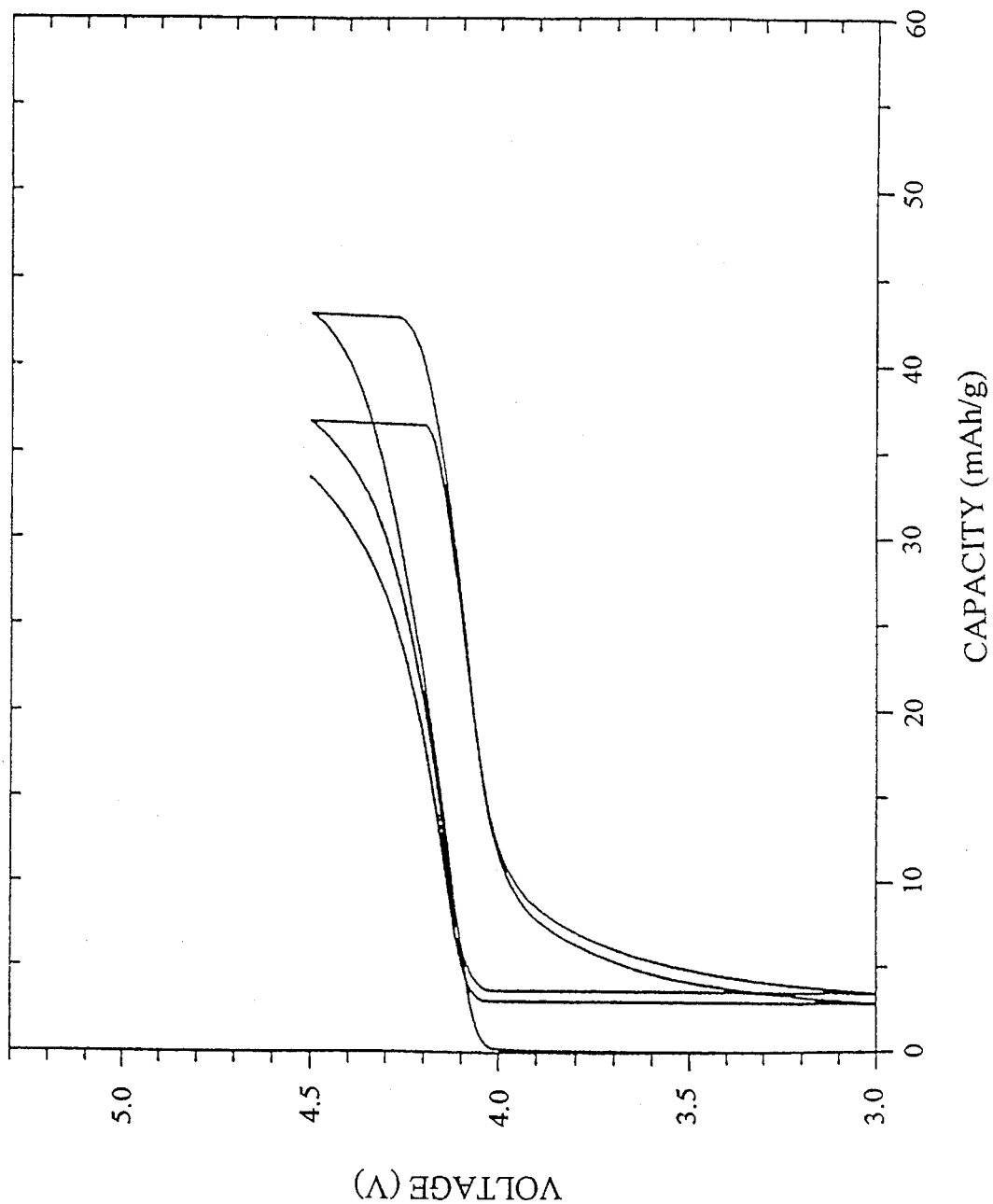
FIG. 8 shows the voltage-capacity relationship of a Li/LiCoVO$_4$ secondary battery prepared from the process disclosed in the present invention.
Figure 9A:
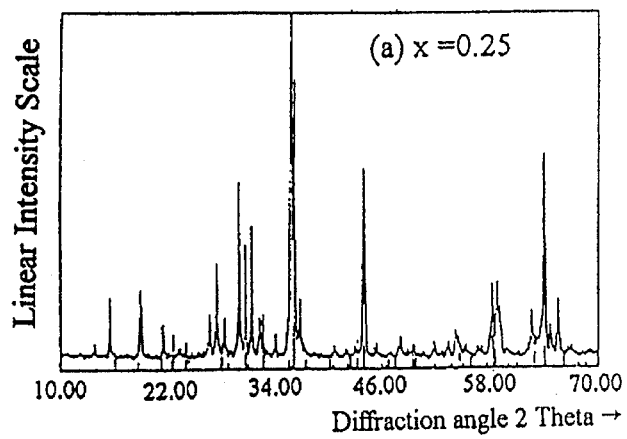
FIG. 9 shows the X-ray diffraction curves of the LiNiVO$_4$ compound prepared from the solid-phase sintering process described in Examples 2–9.
Figure 9B:
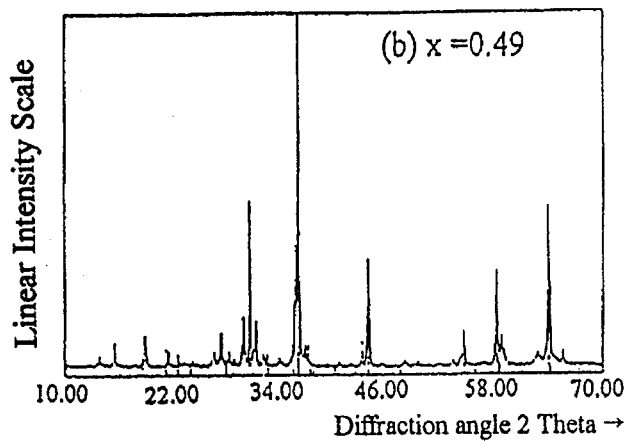
Figure 9C:
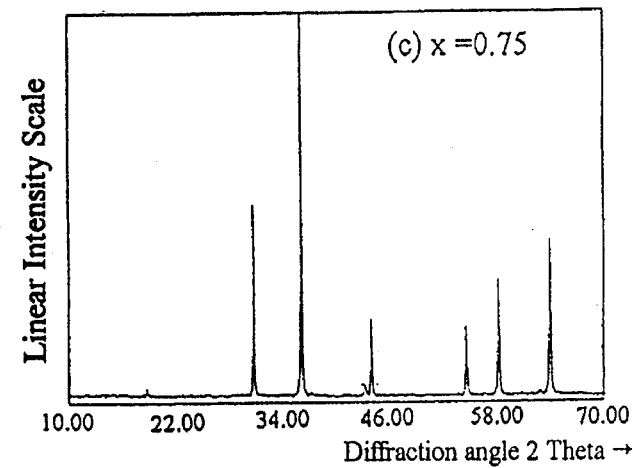
Figure 9D:
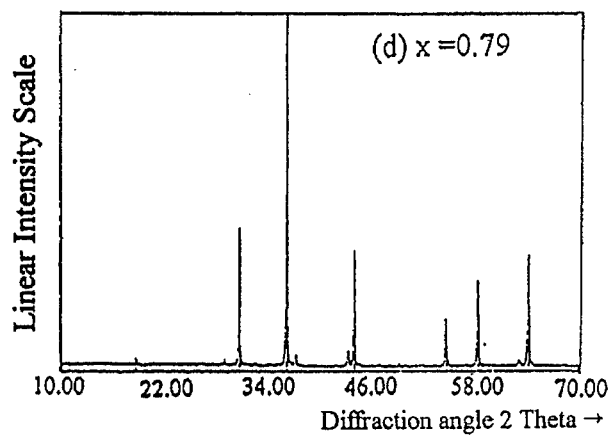
Figure 9E:
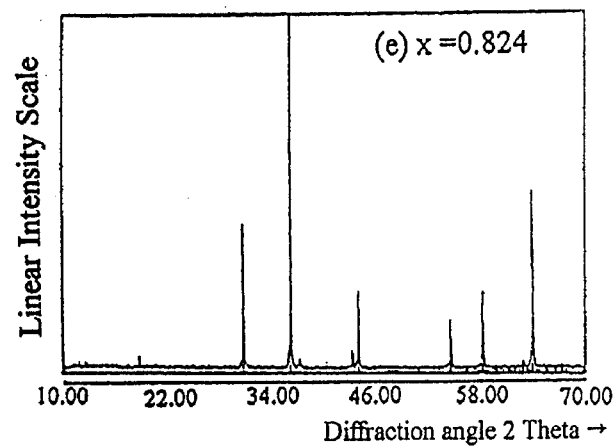
Figure 9F:
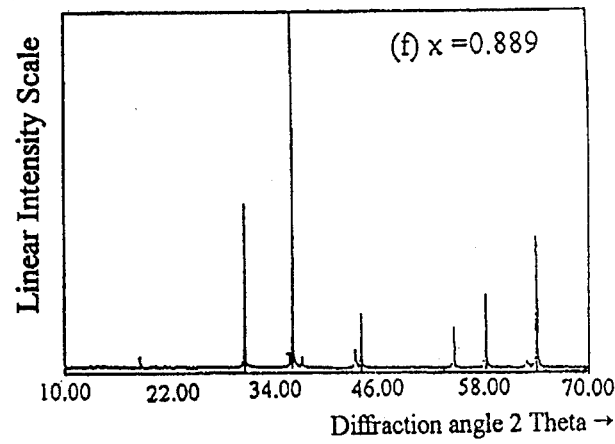
Figure 9G:
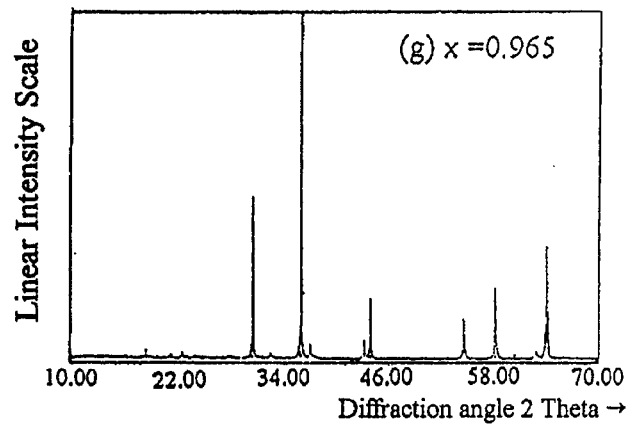
Figure 9H:
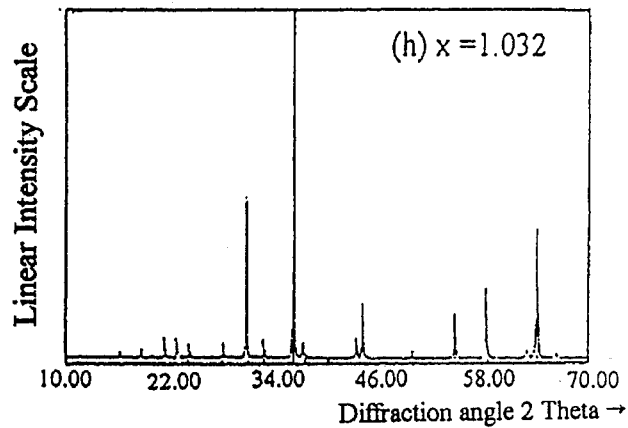
Figure 9I:
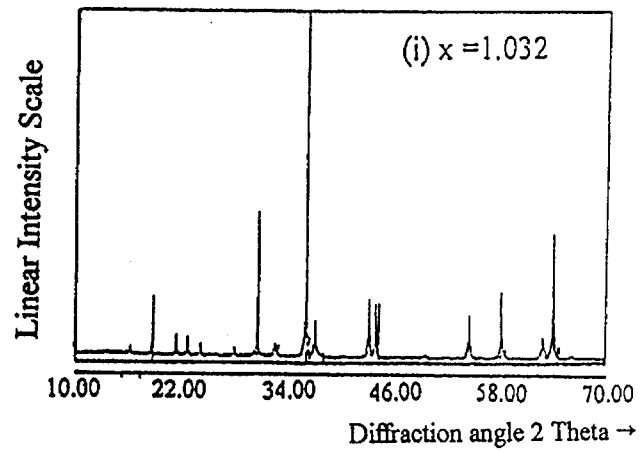

FIG. 6 shows the charge-discharge curve of a Li/LiCoVO$_4$ lithium secondary battery using the second electrolyte solution. The preferred charge/discharge voltage for this system was found to be between 3.0 and 4.5 volts, although it could go as high as 4.9 volts. While the Li/LiCoVO$_4$ lithium secondary battery did not provide output voltage as high as the Li/LiNiVO$_4$ system, it still provides a discharge voltage of above 4.0 volts. This value is also substantially higher than other batteries. The Li/LiCoVO$_4$ lithium secondary battery, however, exhibits a better reversibility than the Li/LiNiVO$_4$ system. This is evident from FIGS. 7 and 8, which show the voltage-capacity relationships of the Li/LiNiVO$_4$ and Li/LiCoVO$_4$ secondary batteries, respectively, prepared from the process disclosed in the present invention. As shown in FIG. 7, the capacity for the Li/LiNiVO$_4$ battery reached 80 mAh/g after the battery was charged to 4.9 volts during the first cycle. However, its capacity decreased to 45 mAh/g during the second cycle. FIG. 8 shows that the Li/LiCoVO$_4$ exhibits a better reversibility, and its capacity approached 40 mAh/g.

Aqueous-Phase Solution Method:

The present invention also discloses a second method, which involves an aqueous-phase reaction and can be summarized by the following reaction formula:

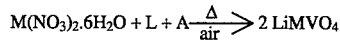

$$M(NO_3)_2 \cdot 6H_2O + L + A \xrightarrow[\text{air}]{\Delta} 2\,LiMVO_4$$

In the above reaction formula, M can be either nickel (Ni) or cobalt (Co); L can be LiOH·H$_2$O, Li$_2$O, Li$_2$CO$_3$, or Li(CH$_3$COO); and A can be V$_2$O$_3$, V$_2$O$_5$, or NH$_4$VO$_3$. To proceed with the reaction, aqueous solutions of M(NO$_3$)$_2$·6H$_2$O and L are mixed for form a precursor aqueous solution. Then compound A is added to the precursor aqueous solution and thoroughly mixed. The mixture solution is then dried and ground. Thereafter, the dried solution is sintered in air at 680° C.~ 700° C. for 1~2 hours to obtain the cathode material LiMVO$_4$.

EXAMPLE 1

1.465 g (0.0152 mol) of Li$_x$NiO$_2$ (x=0.75) and 1.144 g (0.0076 mol) of V$_2$O$_3$ powder were ground and homogeneously mixed, placed inside an aluminum oxide boat, and inserted inside a tubular furnace. The reactants were reacted in air at 700° C. for one hour. Finally 2.560 g (0.0142 mol) of a brownish yellow LiNiVO$_4$ was obtained as the reaction product. This represented a reaction yield of 93.26%.

EXAMPLES 2 THROUGH 8

The procedures in Examples 2 through 8 were identical to that described in Example 1, except that the values of x (in Li$_x$NiO$_2$) were changed to 0.25, 0.49, 0.79, 0.824, 0.889, 0.965, and 1.032, respectively. The purpose of these studies was to observe whether and how the value of x might affect the synthesis of LiNiVO$_4$. FIG. 9 show the X-ray diffraction curves obtained from each of these products. The component analyses of the products are shown in Table 1.

From FIG. 9, it is observed that LiNiVO$_4$ constituted the majority of the reaction products. From Table 1, it is observed that when x equals 0.25 or 0.49, the final products were quite complicated, and some of them were not identifiable. Therefore, these products may not be suitable for use as cathode materials. On the other hand, the x equals 0.75, 0.79, 0.824, or 0.889, the final products contain impurities such as NiO, and small amounts of Li$_3$VO$_4$. The amount of Li$_3$VO$_4$ increased with increased value of x. Highest purity of LiNiVO$_4$ was obtained when x=0.75, in such case, there was almost no NiO present in the final product. Examples 2 through 9 illustrate that, with the process disclosed in the present invention, the purity of the LiNiVO$_4$ product can be controlled by adjusting the value of x of the reactant Li$_x$NiO$_2$.

EXAMPLE 10

Into a container having 200 ml of an aqueous solution containing 0.172 mol of Li(NO$_3$)$_2$·6H$_2$O, 30 ml of an aqueous solution containing 0.172 mol of LiOH·H$_2$O was added. A greenish white gel precipitate was immediately formed. The water temperature was maintained at about 80° C., and the solution was stirred for about fifteen minutes. Thereafter, 0.086 mol of V$_2$O$_5$ was added to the aqueous solution containing the precipitates. Because V$_2$O$_5$ does not dissolve in water, the solution must be thoroughly stirred before it was placed into an oven. The oven temperature was maintained at 80° C. After all the water was evaporated, which took about one day, the remaining solid material was thoroughly blended, wrapped in an aluminum oxide boat, and placed inside a tubular furnace. The reaction proceeded in air at a temperature of 680° C. for two hours to obtain 0.157 mol of final product, LiNiVO$_4$. The reaction yield was 91.54%.

Figure 10:
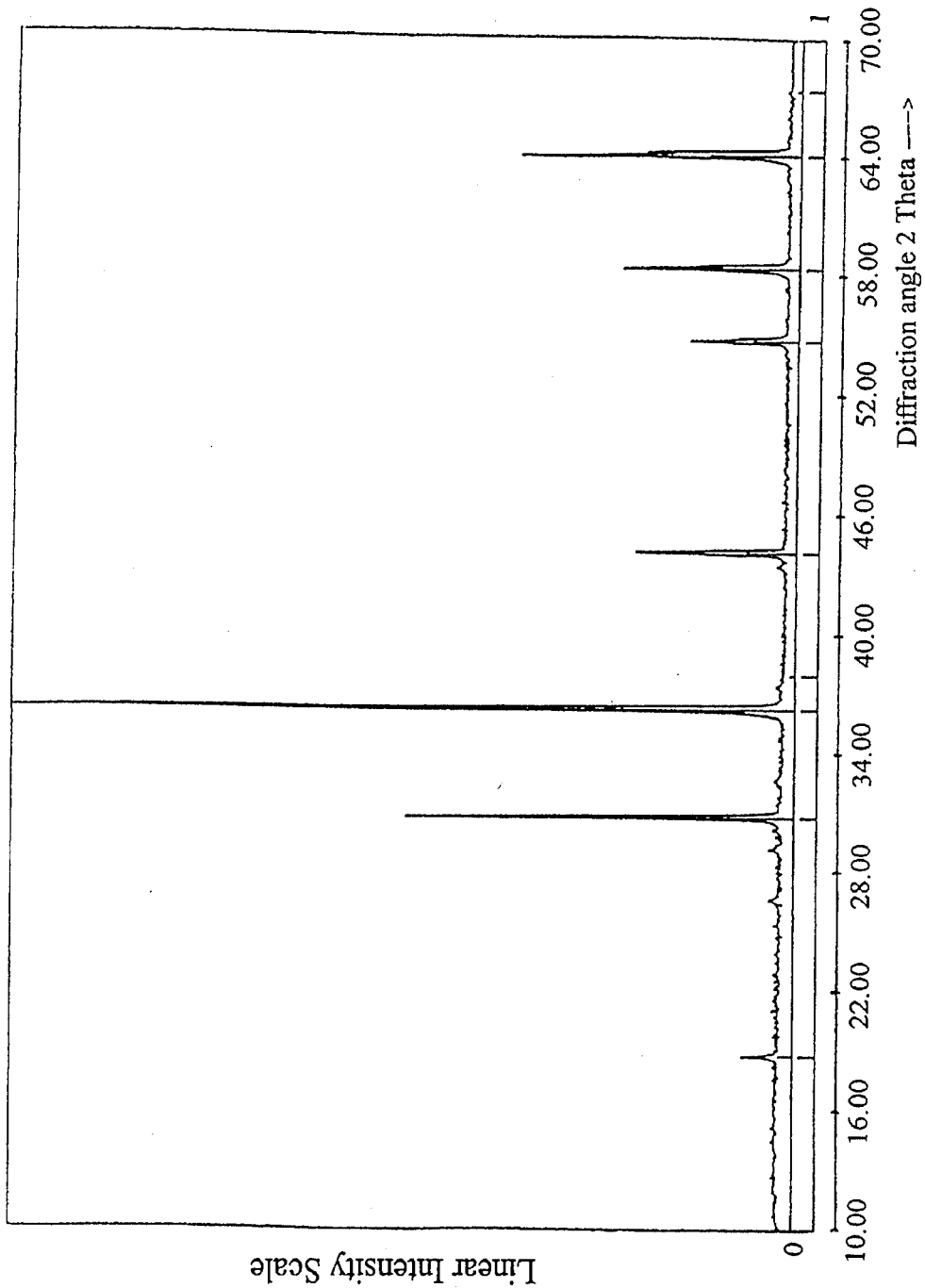
FIG. 10 shows the X-ray diffraction curve of the LiNiVO$_4$ compound prepared from the aqueous-phase solution process disclosed Example 10.

FIG. 10 shows the X-ray diffraction curve of the LiNiVO$_4$ compound prepared from the aqueous-phase solution process disclosed Example 10. As revealed by FIG. 10, very high purity LiNiVO$_4$, with almost no impurity, can be obtained from the aqueous-phase solution process of the present invention. The aqueous-phase process thus has two distinct advantages in that, first, high purity products can be obtained, and second, it can be readily implemented in commercial mass production processes.

EXAMPLE 11

Figure 11A:
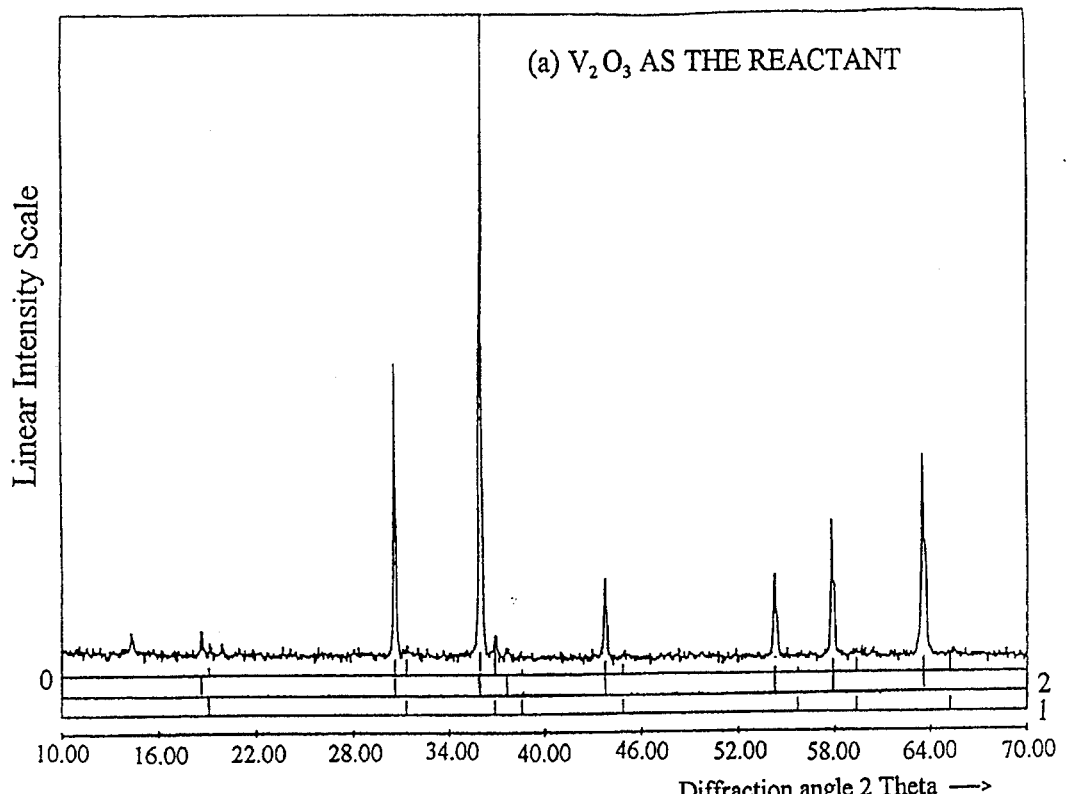

0.120 mol of LiCoO$_2$ and 0.060 mol of V$_2$O$_3$ were thoroughly blended, wrapped in an aluminum oxide boat, placed in a tubular furnace, and sintered in air at 700° C. for one hour. 0.118 mol of silvery-gray black LiCoVO$_4$ was obtained. The reaction yield was 98.21%. FIG. 11a shows the X-ray diffraction curve of the LiCoVO$_4$ compound prepared from the solid-phase sintering process of Example 11. The product contained small amount of impurities such as Co$_3$O$_4$.

EXAMPLE 12

Figure 11B:
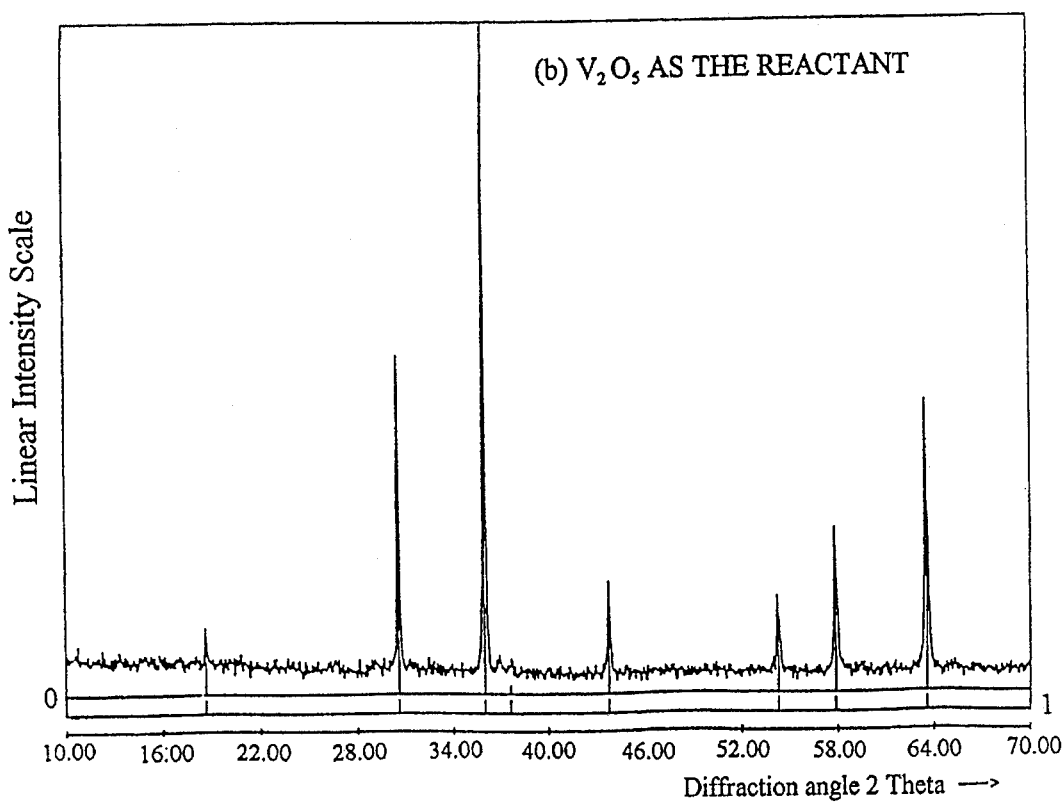

0.146 mol of LiCoO$_2$ and 0.073 mol of V$_2$O$_5$ were thoroughly blended, wrapped in an aluminum oxide boat, placed in a tubular furnace, and sintered in air at 700° C. for one hour. 0.143 mol of silvery-gray black LiCoVO$_4$ was obtained. The reaction yield was 98.56%. FIG. 11b shows the X-ray diffraction curve of the LiCoVO$_4$ compound prepared in this example. Comparing FIGS. 11a and 11b, it can be observed that a higher purity product of LiCoVO$_4$ was obtained when V$_2$O$_5$ was used as a reactant in the solid-phase sintering process instead of V$_2$O$_3$.

EXAMPLE 13

Figure 12:
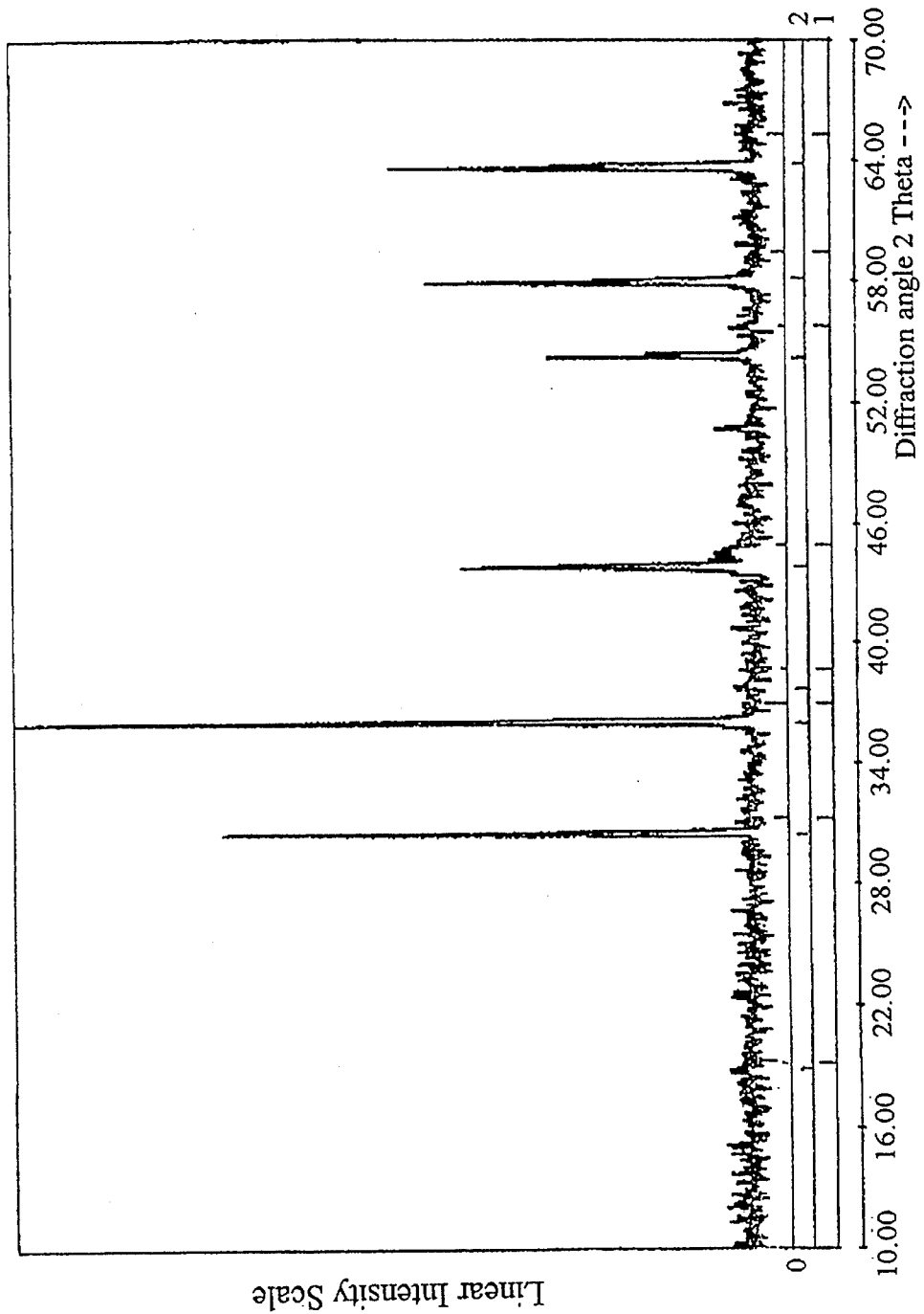
FIG. 12 shows the X-ray diffraction curve of the LiCoVO$_4$ compound prepared from the aqueous-phase solution process disclosed in the present invention.

10 ml of an aqueous solution containing 0.10 mol of Co(NO$_3$)$_2$·6H$_2$O and 5 ml of an aqueous solution containing 0.10 mol of LiOH·H$_2$O were mixed. A dark blue precipitate was immediately formed. The precipitate was heated and stirred at a temperature of about 70° C. for about ten minutes. Thereafter, 0.05 mol of $V_2O_5$ was added to the aqueous solution containing the precipitates and thoroughly stirred before it was placed into an oven. The oven temperature was maintained at 120° C. After about 12 hours, the precipitates in the beaker separated into two layers, but were not completely dried. These two layers were thoroughly blended and placed into the over until they were completely dried. Thereafter, they were removed from the oven, wrapped in an aluminum oxide boat, and placed inside a tubular furnace. The sintering reaction proceeded in air with a rate of temperature rise of 250° C. per hour until it reached 700° C., and maintained at 700° C. for one hour to obtain 0.0906 mol of a conglomerated final product, $LiCoVO_4$. The reaction yield was 90.6%. FIG. 12 shows the X-ray diffraction curve of the $LiCoVO_4$ compound prepared in Example 13. From FIG. 12, it can be seen that the $LiCoVO_4$ product from the aqueous-phase solution process does not contain any impurity such as $Co_3O_4$, and its X-ray diffraction curve corresponds to that of the standard curve.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. For example, although it is contemplated that the $LiNiVO_4$ and $LiCoVO_4$ produced by the processes disclosed in the present invention are excellent materials for use as cathode materials in lithium secondary batteries, they can also be used in sensors as well as in electrocatalysis devices. All such modifications and variations are within the scope of the present invention as determined by the appended claims when interpreted in accordance with the breadth to which they are fairly, legally, and equitably entitled.

TABLE 1

| Value of x in $Li_xNiO_2$ | Reaction Products |
|---|---|
| 0.25 | $LiNiVO_4$ + misc. complicated compounds |
| 0.49 | $LiNiVO_4$ + misc. complicated compounds |
| 0.75 | $LiNiVO_4$ + NiO |
| 0.79 | $LiNiVO_4$ + NiO |
| 0.824 | $LiNiVO_4$ + NiO |
| 0.889 | $LiNiVO_4$ + NiO |
| 0.965 | $LiNiVO_4$ + NiO + $Li_3VO_4$ |
| 1.032 | $LiNiVO_4$ + NiO + $Li_3VO_4$ |

What is claimed is:

1. A method for preparing cathode material for use in lithium secondary batteries comprising the steps of:
   (a) mixing first and second reactants, in a molar ratio of about 2 to 1, to form a reaction mixture, said first reactant being represented by $Li_xMO_2$, wherein M is either Ni or Co, and x is a variable form 0.25 to 1.1, and said second reactant being selected from the group consisting of $V_2O_3$, $V_2O_5$, and $NH_4VO_3$; and
   (b) sintering said reaction mixture in air at temperatures between 650° C. and 700° C. for 1 to 2 hours to obtain an inverse spinel $LiMVO_4$ for use as a cathode material.

2. The method for preparing cathode material for use in lithium secondary batteries according to claim 1 wherein said first reactant is $Li_xNiO_2$.

3. The method for preparing cathode material for use in lithium secondary batteries according to claim 2 wherein said first reactant is $Li_xNiO_2$, and the value of x ranges from 0.75 to 0.80.

4. The method for preparing cathode material for use in lithium secondary batteries according to claim 1 wherein said second reactant is $V_2O_5$.

5. The method for preparing cathode material for use in lithium secondary batteries according to claim 1 wherein said first reactant is $Li_xNiOi_2$ and said sintering step takes place at a temperature of 700° C. for about one hour.

6. The method for preparing cathode material for use in lithium secondary batteries according to claim 1 wherein said cathode material is $LiNiVO_4$.

7. The method for preparing cathode material for use in lithium secondary batteries according to claim 1 wherein said cathode material is $LiCoVO_4$.

8. The method for preparing cathode material for use in lithium secondary batteries according to claim 1 wherein said first reactant is prepared from an aqueous-phase reaction, which comprises the following steps:
   (a) preparing a precursor aqueous solution by mixing a first aqueous solution with a second aqueous solution in a molar ratio of about 1 to 1, said first aqueous solution being an aqueous solution containing $M(NO_3)_2.6H_2O$ and said second aqueous solution being an aqueous solution containing a lithium-containing compound selected form the group consisting of $LiOH.H_2O$, $Li_2O$, $Li_2CO_3$, and $Li(CH_3COO)$; and
   (b) drying said precursor aqueous solution to form said first reactant.

9. A method for preparing cathode material for use in lithium secondary batteries comprising the steps of:
   (a) preparing a precursor aqueous solution by mixing a first aqueous solution with a second aqueous solution in a molar ratio of about 1 to 1, said first aqueous solution being an aqueous solution containing $M(NO_3)_2.6H_2O$, wherein M is selected from the group consisting of Ni and Co, and said second aqueous solution is an aqueous solution containing a lithium-containing compound selected from the group consisting of $LiOH.H_2O$, $Li_2O$, $Li_2CO_3$, and $Li(CH_3COO)$;
   (b) drying said precursor aqueous solution to form a first reactant;
   (c) preparing a solid reaction mixture by mixing said first reactant with a second reactant in a molar ratio of about 2 to 1 to form a reaction mixture, wherein said second reactant is selected from the group consisting of $V_2O_3$, $V_2O_5$, and $NH_4VO_3$; and
   (d) sintering said solid reaction mixture in air at temperatures between 680° C. and 700° C. for 1 to 2 hours to obtain an inverse spinel $LiMVO_4$ for use as a cathode material.

10. The method for preparing cathode material for use in lithium secondary batteries according to claim 9 wherein said cathode material is $LiNiVO_4$.

11. The method for preparing cathode material for use in lithium secondary batteries according to claim 9 wherein said cathode material is $LiCoVO_4$.

* * * * *